Figure 1:
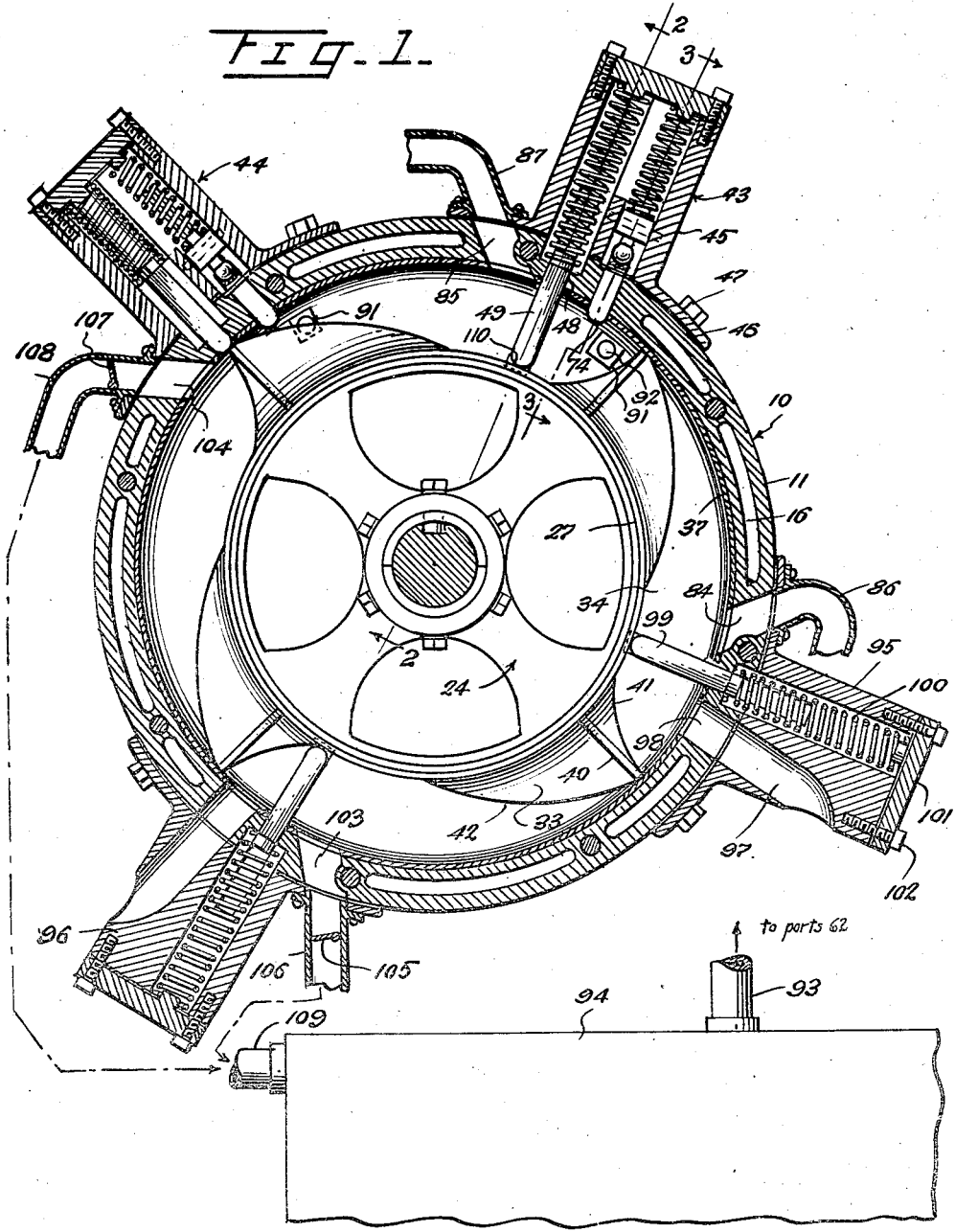

Oct. 8, 1946.                    L. MARGOLIS                    2,409,141
                       ROTARY INTERNAL-COMBUSTION ENGINE
                       Filed Aug. 30, 1944          2 Sheets-Sheet 1

Inventor
LOUIS MARGOLIS

By Kimmel & Crowell
                Attorneys

Inventor
LOUIS MARGOLIS
By Kimmel + Crowell
Attorneys

Patented Oct. 8, 1946

2,409,141

UNITED STATES PATENT OFFICE 2,409,141

ROTARY INTERNAL-COMBUSTION ENGINE

Louis Margolis, Washington, D. C., assignor of five per cent to Eugene Berger, Washington, D. C.

Application August 30, 1944, Serial No. 551,877

1 Claim. (Cl. 123—14)

This invention relates to rotary internal combustion engines.

An object of this invention is to provide a rotary engine having a substantially toroidal cylinder and a plurality of spring-pressed sliding abutments carried by the casing.

Another object of this invention is to provide an engine of this type wherein air is compressed and discharged into a tank on a portion of the stroke of the rotor so that the compressed air may be returned to the firing chambers at the proper time mixed with the desired fuel.

A further object of this invention is to provide an engine of this type embodying an improved valve construction which is actuated by the leading side of the rotor, and the leading side of the rotor is of cam shape so as to open the intake valve in properly timed relation.

A further object of this invention is to provide an improved rotor which may be formed with a plurality of pistons so that a plurality of power strokes will be provided for each revolution. In the form disclosed the rotor is formed with four pistons and as there are two power positions for each piston, there will be eight power strokes for each revolution of the rotor.

With the foregoing objects and others which may hereinafter appear, the invention consists of the novel construction, combination and arrangement of parts as will be more specifically referred to and illustrated in the accompanying drawings, wherein is shown an embodiment of the invention, but it is to be understood that changes, modifications and variations may be resorted to which fall within the scope of the invention as claimed.

Figure 2:
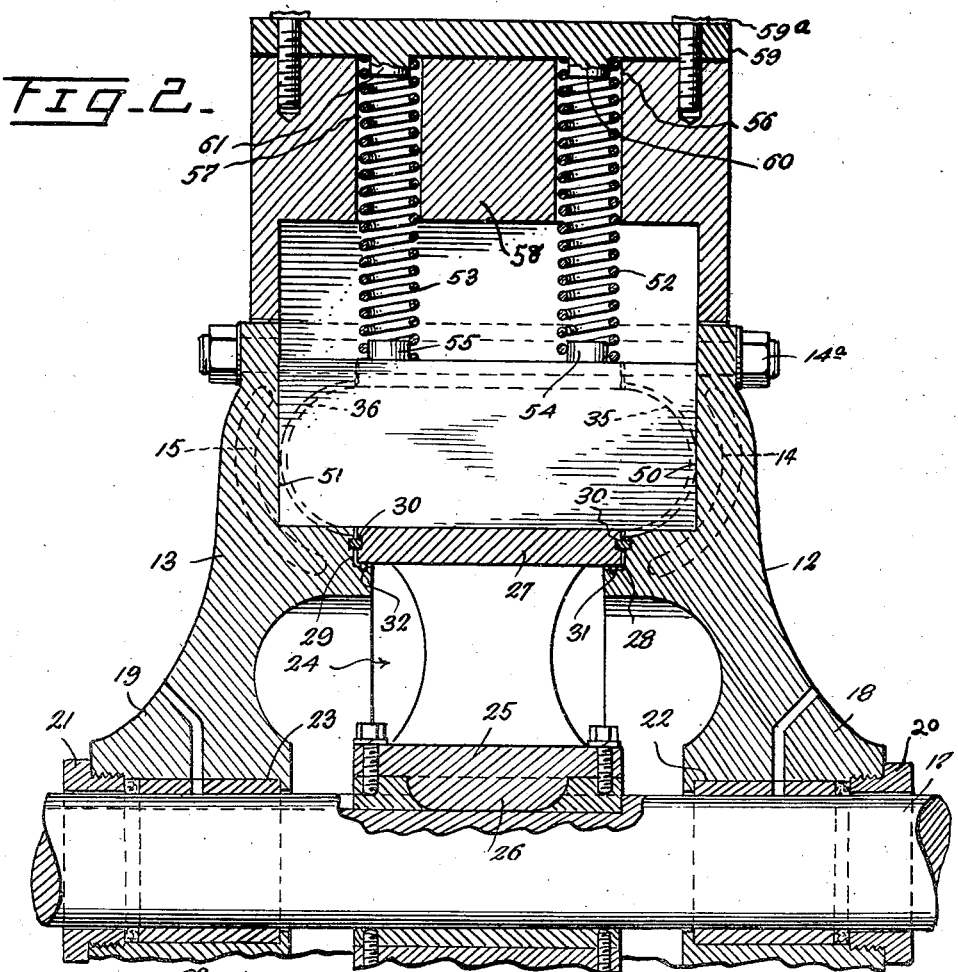
Figure 3:
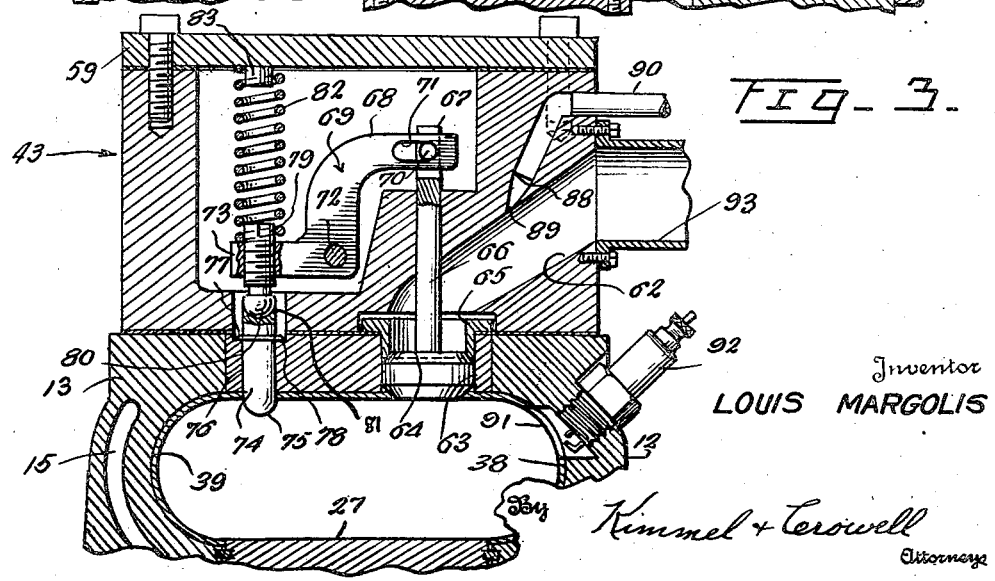

In the drawings:

Figure 1 is a vertical sectional view of a rotary internal combustion engine constructed according to an embodiment of this invention, Figure 2 is a fragmentary sectional view taken on the line 2—2 of Figure 1, and Figure 3 is a fragmentary sectional view taken on the line 3—3 of Figure 1.

Referring to the drawings, the numeral 10 designates generally a casing which is of cylindrical form having a cylindrical side wall 11 and opposite heads 12 and 13 secured to the side wall 11 by fastening members 14ª. The heads 12 and 13 are formed with passages 14 and 15, respectively, for receiving a cooling medium in the form of liquid and the side wall 11 is also provided with a plurality of circumferentially spaced apart passages 16 through which the cooling medium is adapted to pass. A shaft 17 is journalled in bosses 18 and 19 carried by the heads 12 and 13, respectively, the shaft 17 being sealed with respect to the bosses or bearings 18 and 19 by packing glands 20 and 21 respectively.

A bearing sleeve 22 is positioned within the boss 18 engaging about the shaft 17 and a second bearing sleeve 23 is positioned within the boss 19 and engages about the shaft 17 inwardly from the gland 21.

A rotor generally designated as 24 is rotatably mounted within the casing 10 and includes a central hub 25 which is carried or otherwise firmly secured to the shaft 17, as indicated at 26. The rotor 24 includes an outer cylindrical member 27 which rotatably engages in annular recesses 28 and 29 formed in the inner sides of the heads 12 and 13, respectively. The heads 12 and 13 are provided on the opposed edges thereof with sealing rings 30 so as to seal the cylindrical member 27 within the recesses 28 and 29.

A pair of annular lubricating channels 31 and 32 are formed in the heads 12 and 13 in a position confronting the inner side of the cylindrical rotor member 27 for providing proper lubrication for this member. The rotor 24 also includes a plurality of circumferentially spaced apart pistons 33 which are secured to or formed integral with the cylindrical member 27. The heads 12 and 13 and the cylindrical casing member 11 form a substantially toroidal cylinder 34.

In practice the cylinder 34 is of transversely elongated configuration with substantially semicircular cylinder portions 35 and 36 formed in the inner sides of the heads 12 and 13. A liner 37 is disposed on the inner side of the cylindrical casing member 11 and semi-cylindrical liners 38 and 39 are carried by the heads 12 and 13 in the cylinder portions 35 and 36 thereof. Each piston 33 has mounted therein a ring or sealing member 40 which is of split construction being semi-circular at the outer ends and extending straight across the cylindrical member 11. Each piston 33 is formed at its trailing end with a concave surface 41 merging into the periphery of the cylindrical member 27 and is formed at its leading side or end with a convex surface 42. The concave rear surface 41 forms a moving abutment for engagement by the explosive gases when the rotor is in operation.

The casing 10 has secured thereto and projecting from the cylindrical member 11 a pair of housings 43 and 44. The housings 43 and 44 are of like construction and each includes a hollow housing member 45 formed with an inner flange 46 secured by fastening members 47 to the cylindrical member 11. The cylindrical member 11 is formed with an opening 48 communicating the cylinder 34 with the housing 43, and a sliding abutment 49 in the form of a flat plate slidably engages through the opening 48.

The two heads 12 and 13 are formed with abutment guide passages 50 and 51, respectively, and the abutment 49 is slightly wider than the distance transversely across the cylinder 34. The abutment 49 is constantly urged inwardly by means of a pair of springs 52 and 53 which at their inner ends engage about studs 54 and 55, respectively, carried by the outer edge of the abutment 49. The springs 52 and 53 engage in openings 56 and 57 formed in the outer wall 58 of the hollow member 45 and a head 59 closes the outer end of the housing member 45 being secured thereto by fastening members 59a.

The head 59 is also formed with inwardly projecting studs 60 and 61 about which the outer ends of the springs 52 and 53, respectively, engage. The convex leading side 42 of each piston 33 forms a cam by means of which the abutment 49 is moved outwardly against the tension of the springs 52 and 53. Each housing member 43 and 44 is formed with an intake port 62 communicating with an intake port 63 formed in the cylindrical member 11. A tappet valve 64 which opens inwardly is adapted to normally engage a removable seat member 65 carried by the cylindrical member 11. The valve member 64 includes a valve stem 66 having bifurcated upper end 67, and one arm 68 of a bell crank 69 slidably engages in the slot formed by bifurcating the outer end of the stem 66.

A pin 70 is extended across the bifurcated portion 67 of the stem 66 and loosely engages in an elongated slot 71 which is formed in the bell crank arm 68. The bell crank 69 is rockably mounted on a pin 72 carried by the housing member 43, and the opposite arm 73 of the bell crank has secured thereto a valve operating pin 74. The inner end 75 of the pin 74 projects into the cylinder 34 through an opening 76 formed in the cylindrical member 11 and the pin 74 is formed with an annular rib or shoulder 77 engaging against a shoulder 78 formed in the cylindrical member 11. The arm 73 is coupled to the pin 74 by means of a pin adjusting member 79 which is threaded through the arm 73 and is formed at its inner end with a ball 80 engaging in a ball socket 81 formed in the outer end of the pin 74. A spring 82 engages at its inner end about the adjusting member 79, and at its outer end engages about a stud 83 carried by the head 59. The valve operating pin 74 is disposed on the trailing side of the abutment 49 and is adapted to be moved outwardly to shift valve 64 to open position after abutment 49 is moved inwardly by the springs 52 and 53 across the cylinder 34.

The casing 10 is formed with a pair of exhaust ports 84 and 85 correlated with the housings 43 and 44 and disposed forwardly thereof so that burned gases will be exhausted from the cylinder 34 before unexploded gases enter the cylinder. An exhaust pipe 86 is secured to the casing member 11 communicating with the port 84 and a second exhaust pipe 87 is secured to the cylindrical member 11 and communicates with exhaust port 85.

The housing member 43 is formed with a fuel injecting port 88 terminating in a jet opening 89 communicating with the intake port 62. A fuel line 90 is connected to the duct or passage 88 for discharging fuel into the intake port 62 where the fuel will be sprayed into and mixed with the incoming air, the latter being under predetermined pressure. A combustion chamber 91 is formed adjacent each intake port 63 and an igniter 92 in the form of a spark plug is positioned in each combustion chamber 91 for igniting the combustible fuel in properly timed relation. The air intake port 62 has connected to the outer end thereof an air conducting pipe 93, the latter being connected at the opposite end thereof to an air pressure tank 94. Air is discharged into the air pressure tank 94 at each revolution of the rotor 24 and in order to provide for the desired quantity of air being discharged into the tank 94, I have provided a pair of air intake housings 95 and 96 which are circumferentially spaced from each other and from the abutment housings 43 and 44. The air intake housings 95 and 96 are of like construction and each housing is provided with an air intake port 97 communicating through a port 98 formed in the cylindrical member 11.

A sliding abutment 99 is correlated with each housing 95 and 96 being spring-pressed to an inner position by means of one or more springs 100. The springs 100 at their outer ends bear against an outer head 101 secured by fastening members 102 to the housing 95.

The casing 11 is provided with a pair of air exhaust ports 103 and 104, port 103 being correlated with housing 95 and port 104 being correlated with housing 96. An outwardly opening check valve 105 is mounted in an air pipe 106 which is connected to port 103 and an outwardly opening check valve 107 in an air pipe 108 is correlated with air exhaust port 104. The two pipes 106 and 108 are adapted to be connected to the pressure tank 94 by means of a common pipe or manifold 109.

In the use and operation of this engine, the casing 10 may be mounted on a suitable base with the shaft 17 in a horizontal position. Upon initial rotation or starting of the rotor 24 one piston 33 will initially move valve operating pin 74 outwardly and the latter will move valve 64 inwardly so as to permit air under pressure which will be mixed with fuel discharged from jet 89 to enter the cylinder 34. Assuming that the valve 64 of housing 44 is initially moved to open position when the cam member or convex forward portion 42 of piston 33 passes pin 74, the abutment 49 correlated with housing 44 and which has at this time been moved to an outermost position will be forced inwardly along the convex trailing side 41 of a piston.

Preferably, the inner edge of the abutment 49 is rounded as at 110 so as to provide a seal between abutment 49 and piston 33 as abutment 49 moves inwardly. When piston 33 passes valve opening pin 74, igniter 92 will be ignited under suitable timing means so as to ignite the combined air and vaporized fuel. The expansion of the burned gases will then force piston 33 from abutment 49 correlated with housing 44, and as this piston moves clockwise toward housing 43, abutment 49 correlated with housing 43 will be moved outwardly and when the trailing end of the piston passes exhaust portion 85 the burned gases at the rear of the piston will be discharged through exhaust ports 85 and exhaust pipe 87.

The same cycle will be obtained by abutment 49 and pin 74 correlated with housing 43. In the present instance, the two housings 43 and 44 which comprise the fuel intake means are circumferentially spaced apart a relatively short distance, whereas the air pressure housings 95 and 96 are spaced from each other and from the housings 43 and 44 a substantial distance. In other words, housing 95 is slightly less than diametrically opposite housing 44 and the same is true of housings 43 and 96.

Housings 43 and 44 being less than 45° apart, and rotor 24 having four pistons, rotor 24 will be under a continuous power impulse, the combustion chamber 91 associated with housing 43 providing the first or leading impulse. Combustion chamber 91 associated with housing 43 will provide another power impulse before the gases have fully expanded under the first impulse, so that in effect there will be two power impulses which are continuously acting to rotate rotor 24.

What I claim is:

A rotary internal combustion engine comprising a substantially toroidal cylinder, a rotor including a plurality of circumferentially spaced apart pistons movable in said cylinder, a housing extending radially from and secured to said cylinder, an abutment slidably carried by said housing and normally biased to a position across said cylinder, each piston including a cam-shaped leading portion engageable with said abutment for moving the latter outwardly into said housing, a fuel intake valve carried by said housing, and means connected to said valve and projecting into said cylinder in a position for engagement with said cam-shaped leading portion for moving said valve to open position, said latter means including a bell crank pivotally carried by said housing and having an elongated slot in one arm thereof, a pin carried by said valve loosely engaging in said slot, a second pin slidable through said cylinder, and means rockably connecting said second pin to the other arm of said bell crank.

LOUIS MARGOLIS.